Figure 15:
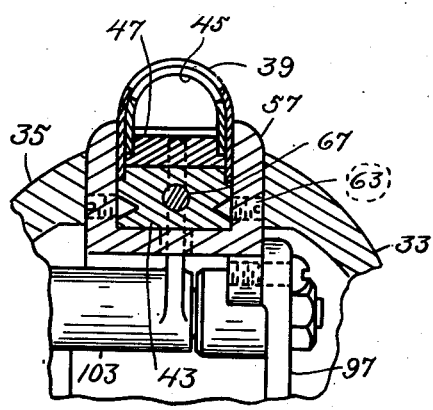

June 6, 1944.  B. G. OLVING  2,350,805
ELECTRIC RAZOR
Filed May 24, 1943  4 Sheets-Sheet 1
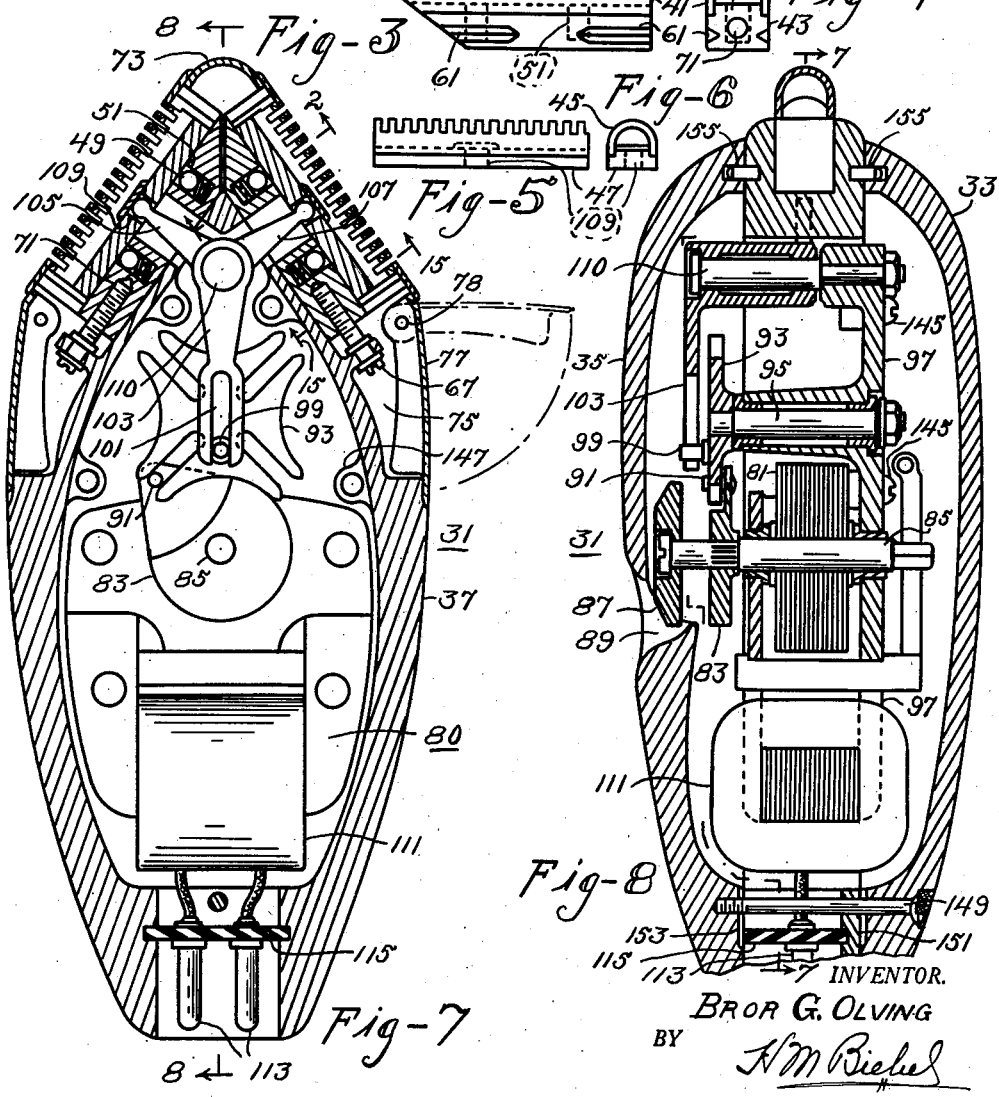
INVENTOR.
BROR G. OLVING
BY
ATTORNEY

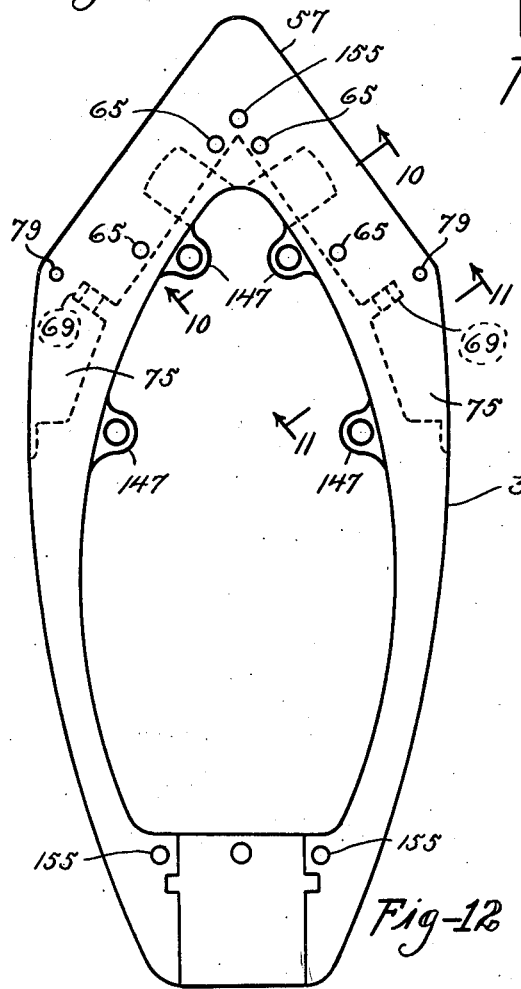

June 6, 1944.  B. G. OLVING  2,350,805
ELECTRIC RAZOR
Filed May 24, 1943  4 Sheets-Sheet 4

INVENTOR.
BROR G. OLVING
BY
ATTORNEY

Patented June 6, 1944

2,350,805

UNITED STATES PATENT OFFICE 2,350,805

ELECTRIC RAZOR

Bror G. Olving, Elgin, Ill., assignor to McGraw Electric Company, Elgin, Ill., a corporation of Delaware Application May 24, 1943, Serial No. 488,281

11 Claims. (Cl. 30—43)

My invention relates to electric razors.

One object of my invention is to provide an electric razor or dry shaver having a plurality of shaving heads extending angularly relatively to each other at one end of a casing, the two heads being so designed and constructed that one head will be adapted for coarse hair and the other head will be adapted for fine hair.

Another object of my invention is to provide an electric razor having a novel form of mechanical drive for the movable cutter bars that shall insure that the slots in the shaving heads shall be open a major portion of the total operating cycle.

Another object of my invention is to provide an electric razor embodying a pair of shaving heads and comprising a minimum number of operative parts.

Another object of my invention is to provide an electric razor that will not pull the hair or pinch or burn the skin of the user.

Another object of my invention is to provide mechanical means for driving the movable cutter bars relatively to the stationary heads at a rate of speed much higher than that provided by any means used in other electric dry shavers.

Still another object of my invention is to provide an electric razor comprising a single frame to support the driving motor and the shaving heads.

Other objects of my invention will either be apparent from a description of one form of device embodying my invention or will be pointed out in the course of such description and particularly set forth in the appended claims.

Figure 16:
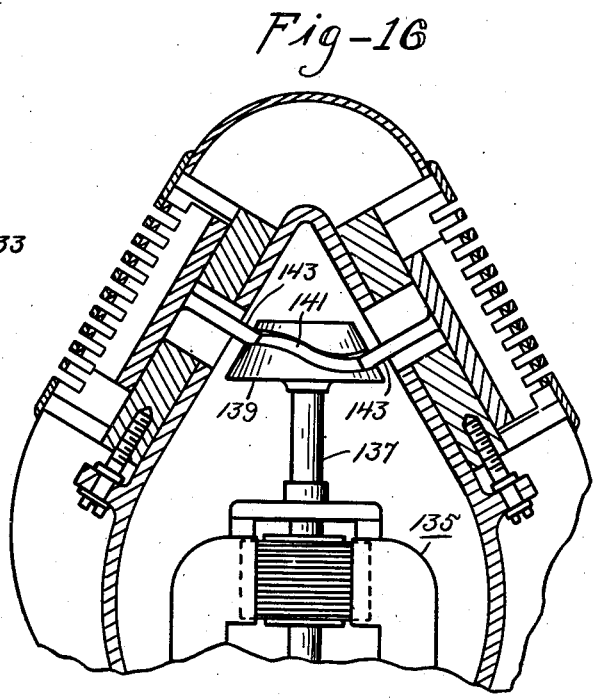
Figure 17:
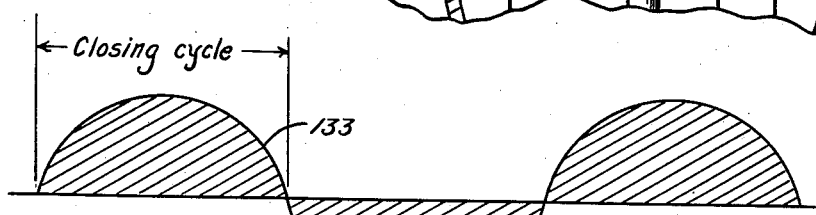
Figure 18:
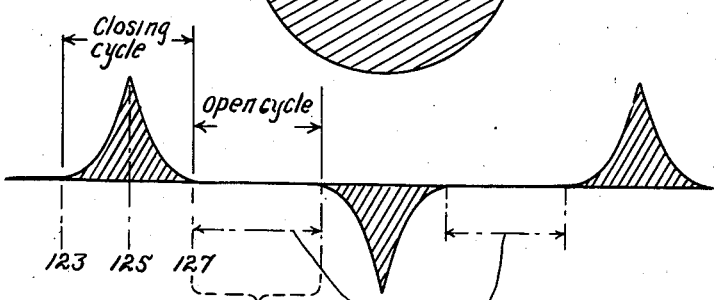
Figure 19:
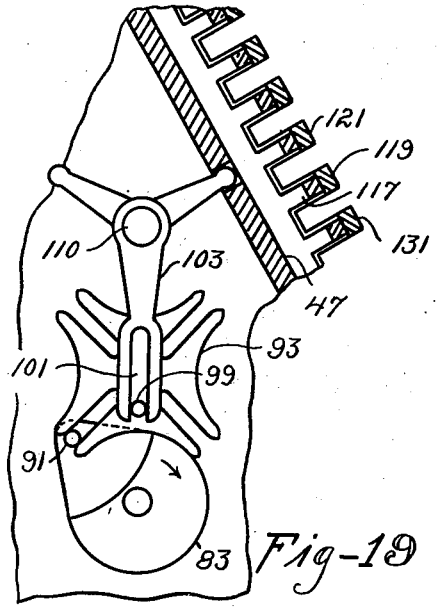
Figure 20:
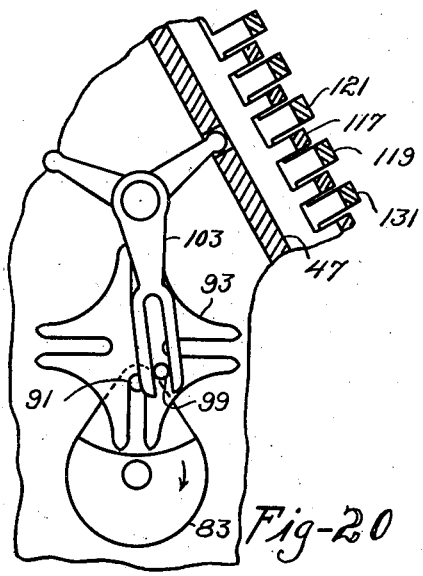
Figure 21:
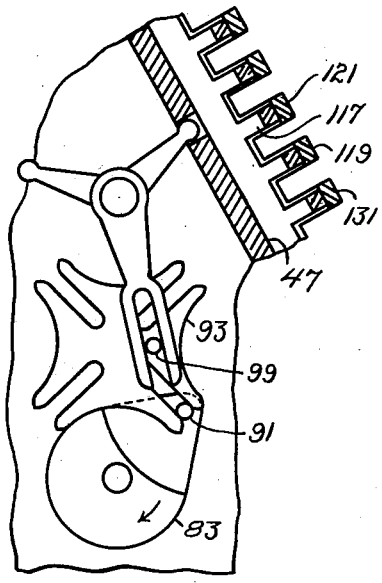
Figures 22, 23:
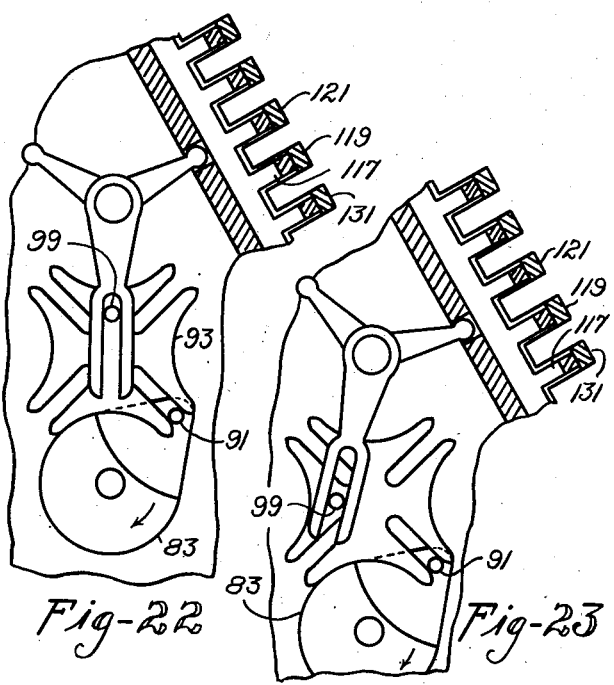

In the drawings,

Figure 1 is a top plan view of my improved electric razor,

Fig. 2 is a fragmentary sectional view therethrough taken on the line 2—2 of Fig. 7, Fig. 3 is a side elevational view of a cutter head, Fig. 4 is an end view of the parts shown in Fig. 3, Fig. 5 is a side elevational view of a cutter bar, Fig. 6 is an end view of the parts shown in Fig. 5, Fig. 7 is a sectional view taken on the line 7—7 of Fig. 8, Fig. 8 is a sectional view taken on the line 8—8 of Fig. 7, Fig. 9 is a top plan view of the skeleton frame shown in Fig. 12, Fig. 10 is a fragmentary sectional view on the line 10—10 of Fig. 12, Fig. 11 is a fragmentary sectional view taken on the line 11—11 of Fig. 12, Fig. 12 is a view in front elevation of the part shown in Fig. 13, Fig. 13 is a side view of the skeleton frame shown in Fig. 12, Fig. 14 is a bottom view of the part shown in Fig. 12, Fig. 15 is a fragmentary sectional view on an enlarged scale taken on the line 15—15 of Fig. 7, Fig. 16 is a fragmentary sectional view on an enlarged scale showing a modification of the mechanical drive, Fig. 17 is a graphical curve illustrating the movement of a cutter bar used in shavers of the kind heretofore made and sold, Fig. 18 is a graphical curve applying to a shaver embodying my invention and illustrates the percentage of the time during which the slots in the cutting heads are open, Fig. 19 is a fragmentary view showing the driving means for the cutting bar at the beginning of a cutter bar movement, Fig. 20 is substantially the same as Fig. 19 except that the cutter bars are at the middle of their stroke and travel, Fig. 21 is the same as Fig. 20 except that the cutter bars are at the end of a stroke, Fig. 22 is the same as Fig. 21 except that the cutter bars have made a return stroke, and, Fig. 23 is the same as Fig. 22 except that the cutter bars have made an additional stroke.

An electric razor or dry shaver assembly 31 comprises a rear casing member 33, a front casing member 35 which are of such shape as to be easily held in the hand of the user. The two casing or housing parts 33 and 35 are located on opposite sides of a skeleton frame 37 the outlines of the 3 parts being such as to cooperate to provide a housing for the driving parts to be hereinafter set forth in detail.

I provide two cutting heads, each comprising a laterally slotted sheet metal member 39 which may be of substantially U-shape and have its side edge portions 41 suitably secured against a supporting bar 43 by any suitable means now well known in the art.

Within the respective cutting heads I provide a longitudinally reciprocally movable cutter bar 45 which may also be of substantially U-shape, be laterally slotted, and have its side edge portions suitably secured to a supporting bar or member 47. The movable cutter bar is adaptable to fit inside of the member 39 of the fixedly mounted cutting head and I may provide means for yieldingly maintaining the cutter bar 45 in close operative engagement with the inside surface of the cutter head 39 this means including a ball 49 adapted to fit into a recess 51 in supporting member 43 together with a biasing spring 53. While I may use only one such biasing means I have shown two such springs 53 each positioned within a recess 51 in member 43.

I wish to point out that the two shaving heads may be designed and constructed to be adapted to shave off different hairs such as fine hair and coarse hair. This may be done by any one of the methods now well known in the art, as by different widths of slots in the respective stationary heads 39.

Skeleton frame 37 may have substantially the shape shown in Figs. 9 to 14 inclusive and may be made of suitable initially plastic material which has been formed to the desired shape and dimensions all in a manner now well known in the art.

The stationary cutter heads each comprising members 39 and 43 may be held against the upper tapering head 57 of member 37 in a recess 59, this recess being of substantially U-shape. Member 43 of the fixed cutter head is provided with a pair of V-shaped elongated recesses 61 at each side thereof, (see Figs. 3 and 4) to receive short machine screws 63 which extend through suitable openings 65 located in proper position in the upper or the head end of member 37. The short machine screws 63 are preferably headless and it is to be understood that they guide but do not clamp the substantially fixed cutter heads in the recess 59 since I provide means for adjusting the longitudinal position of the respective cutter heads by adjusting screws 67 which extend through perforated lugs 69 to have their screw threaded outer end portions fit into and have screw threaded engagement with an opening 71 at the inner end of the respective members 43. It has been found desirable to provide such fixed cutter head adjustment in order to obtain the initial proper relative positions of the fixed and of the movable cutter head and cutting bar.

I provide a small closure plate 73 which is adapted to fit beneath the outer ends of the substantially fixed cutter head members 39.

In order to receive the shaved hair or bristles I provide a recess 75 which is effective not only to house the adjusting screw 67 but is closed by a pivotally mounted cover member 77 carried by a pivot pin 78 fitting into apertures 79 which may be easily moved to open position such as is shown by the broken lines on the right hand side of Fig. 7 to permit of depositing the hair shaved off into any suitable or desired receptacle.

In order to obtain reciprocatory movement of the movable cutting bars comprising members 45 and 47 I provide an electric motor assembly 80 which has a rotatable armature 81 suitably rotatably supported in any desired manner in the motor structure. I provide a crank disc 83 at one end of the armature shaft 85 and I may provide a starting wheel 87 part of which is manually actuable by the user through an opening 89 in side or cover plate 35. Crank disc 83 has a crank pin 91 thereon which meshes with a Geneva wheel 93 which is fixed on a shaft 95 which is suitably rotatably supported in a part 97 of the motor frame, the armature shaft 85 being also supported by said frame 97.

I provide a crank pin 99 on the Geneva wheel 93 which crank pin 99 is adapted to move in a slot 101 provided in an actuating arm 103 of substantially Y-shape having two somewhat shorter arms 105 and 107 each of which is adapted to have a clearance fit into an opening 109 in member 47 of the movable cutter bar. The actuating arm 103 is pivotally mounted as on a pivot pin 110 which is also supported by and on frame 97.

The motor 80 is provided with an energizing coil 111 the terminals whereof are connected to two contact pins 113 which may be suitably fixedly supported as by a small plate 115 of electric-insulating material positioned in a recess in the lower end of the casing assembly.

Referring now to Figs. 19 to 23 inclusive of the drawings I have there shown a number of different operative positions of my improved driving means. Referring first of all to Fig. 19 I have there shown crank pin 99 in what may be called, for illustrative purposes only, an initial or starting position, the crank pin 91 on crank disc 83 having just entered one of the four slots provided in the Geneva wheel 93. The laterally slotted cutter bar 45 is in a position where laterally extending tooth 117 will be under one tooth 119 of stationary cutter head 39. Let it be assumed that crank disc 83 is rotated in a clockwise direction reference to Fig. 20 will show that crank pin 91 has moved in one of the slots in Geneva wheel 93 to substantially the inner end thereof at the same time causing crank pin 99 on the Geneva wheel to move to the position shown in Fig. 20 thereby causing outward movement of the cutter head shown in Fig. 20 to a position where tooth 117 has moved out from under one of the teeth 119 of the stationary cutter head and is now alined with a slot between tooth 119 and the next adjacent tooth 121.

Referring now to Fig. 18 of the drawings I have there shown generally only the movement of the respective movable (inner) cutter bars, point 123 in Fig. 18 corresponding to the position of the parts shown in Fig. 19 of the drawings. Point 125 of Fig. 18 corresponds to the positions of the parts shown in Fig. 20 of the drawings. Continued rotation of crank disc 83 in a clockwise direction to the positions shown in Fig. 21 of the drawings shows that one tooth 117 of the movable cutter bar has been moved under a second tooth 121 of the fixed outer cutter head and this position corresponds to point 127 on Fig. 18.

Further rotation of crank disc 83 causes movement of crank pin 91 until it has been moved through an angle greater than 180° and is ready to enter the next radial slot in Geneva wheel 93. This interval of time is shown in Fig. 18 by the numeral 129.

Further rotation of crank disc 83 in a clockwise direction will cause movement of pin 99 from the position shown in Fig. 21 to the position shown in Fig. 22 with the result that tooth 117 has been moved in a reverse direction under tooth 119 of the outer cutter head. Further rotation of crank disc 83 will cause movement of crank pin 99 on the Geneva wheel from the position shown in Fig. 22 to the position shown in Fig. 23 with the result that the tooth 117 of the movable cutter bar will be located below tooth 131 of the outer cutter bar.

It is therefore evident that the spaces between the teeth 119, 121 and 131 of the fixed outer cutter heads are unoccupied or open for substantially the greater part of the cycle and further that the motion of the movable inner cutter bar is relatively very fast thereby clearly distinguishing the operation of my improved electric razor from that of the usual kind in which the travel of the cutter bar is shown by the curve 133 of Fig. 17.

Referring now to Fig. 16 of the drawings I have there shown a somewhat different actuating means for the movable inner cutter bars hereinbefore described. I provide an electric motor 135 having an armature shaft 137 which armature shaft instead of extending laterally of the casing extends substantially longitudinally thereof. I provide a frusto-conical member 139 which is fixed on the end of armature shaft 137 and has a slot 141 therein. The general contour of this slot is such that substantially the same movement of the movable cutter bars is obtained as is done by use of the Geneva wheel drive hereinbefore described. The cutter bars may be provided with inwardly projecting extensions 143, the inner ends of which are adapted to fit into the cam slot 141 so that rotational movement of armature shaft 137 and therefore rotational movement of member 139 will cause reciprocatory movement of the inner cutter bars and it may be here pointed out that the respective cutter bars move in opposite directions, that is when say the right hand cutter bar is moving upwardly (as seen say in Fig. 7 of the drawings) the left hand cutter bar is moving downwardly with the result that there is little or no unbalance effected, thus making it easier for a user to support and hold the razor while using the same.

The motor frame or assembly may be held within the skeleton frame by a plurality of short machine screws 145 extending through openings in member 97 and having screw threaded engagement with lugs 147 integral with member 37.

The outer casing portions 33 and 35 may be held in close operative engagement against the side faces of member 37 as by a machine screw 149 at the lower end of member 37. I provide recesses 151 and 153 in the lower end portion of casing members 33 and 35 so that tightening of screw 149 will hold casing portions 33 and 35 in close operative engagement against member 37. Relative lateral movement of parts 33, 35 and 37 is prevented by a plurality of short studs 155.

The device embodying my invention thus provides a relatively simple dry shaver or electric razor assembly having a minimum number of parts for the desired purpose. The driving mechanism for the movable cutter heads, including more particularly the Geneva wheel, provides a means effective for the desired purpose of insuring that the slots in the cutter heads shall be open for a majority of the total time and the same comments will apply to the modification shown in Fig. 16 of the drawings.

Various modifications may be made in the device embodying my invention without departing from the spirit and scope thereof and all such modifications clearly coming within the appended claims shall be considered to be covered thereby.

I claim as my invention:

1. An electric razor comprising a handle casing, a driving means in said casing, a pair of shaving heads at one end of said handle at opposite sides thereof extending longitudinally of the handle casing angularly relatively to each other and to the longitudinal axis of the handle casing and mechanical means connecting said driving means and said shaving heads to cause longitudinal reciprocatory movement of parts of said heads.

2. An electric razor comprising a handle casing, a pair of shaving heads at opposite sides of one end of said handle said heads extending longitudinally of the handle casing, at an acute angle relatively to each other and to the longitudinal axis of the handle casing, an electric motor and a Geneva gear in the casing and a single lever arm operatively connecting the Geneva gear and the shaving head to operate the latter.

3. An electric razor comprising a handle casing, a pair of substantially fixed outer shaving heads in inverted V-shaped position extending longitudinally of the handle casing at opposite sides thereof, a movable cutter bar in each of said outer heads movable longitudinally thereof, a lever arm of Y-shape pivotally mounted between said shaving heads and having the end portions of two of its branches operatively engaging the pair of cutter bars and motor driven means engaging the other of said branches to cause oscillatory movement of the lever arm of Y-shape and reverse reciprocatory movements of the cutter bars.

4. An electric razor comprising a handle casing, a substantially fixed outer slotted shaving head at one end of said handle casing, a slotted cutter bar reciprocably movable in said shaving head, a pivotally mounted lever arm adapted to cause said reciprocable movements of the cutter bar, an electric motor in said handle casing and means including a Geneva wheel connecting said motor and said lever arm.

5. An electric razor comprising a handle casing, a substantially fixed outer slotted shaving head extending longitudinally of said handle casing at one end thereof, a slotted cutter bar reciprocably movable in said shaving head, a pivotally mounted lever arm adapted to cause reciprocable movement of said cutter bar, an electric motor in said handle casing a crank arm rotated at substantially uniform peripheral speed by said motor, a Geneva wheel rotated at non-uniform peripheral speed by said crank arm, a crank pin on said Geneva wheel engaging said lever arm to cause quick reciprocal movements of the lever arm during a relatively small part of a time period.

6. An electric razor comprising a handle casing, a pair of substantially fixed slotted outer shaving heads angularly positioned relatively to each other and to the longitudinal axis of the handle casing at one end of the handle casing, slotted cutter bars reciprocably movable in said shaving heads, a lever arm of substantially Y-shape pivotally mounted at the junction of its arms and the outer ends of two of its arms engaging said cutter bars, an electric motor in said casing, a crank arm rotated at substantially uniform peripheral speed by said motor, a Geneva wheel rotated at non-uniform peripheral speed by said crank arm, a crank pin on said Geneva wheel having a sliding engagement with the third arm of said lever arm of Y-shape to cause reverse reciprocatory movements of the two cutter bars during a relatively limited portion of a cycle of operation of the cutter bars.

7. An electric razor comprising a handle casing, a pair of substantially fixed outer shaving heads at one end of the handle casing at opposite edges thereof extending longitudinally of the casing in inverted V-shaped position relatively to each other, cutter bars in the respective shaving heads, motor means to actuate the cutter bars in said shaving heads, a pair of recesses in the handle casing adjacent to the inner ends of the respective shaving heads and a cover plate for each of said recesses.

8. An electric razor comprising a handle casing, a pair of substantially fixed outer shaving heads at one end of the handle casing at opposite edges thereof extending longitudinally of the casing in inverted V-shaped position relatively to each other, cutter bars in the respective shaving heads, motor means to actuate the cutter bars in said shaving heads, a pair of recesses in the handle casing adjacent to the inner ends of the respective shaving heads, a cover plate for each recess and an adjusting screw for each of said shaving heads held by said handle casing in said recesses.

9. An electric razor comprising a hollow handle casing, an electric motor in said casing, a pair of substantially fixed elongated shaving heads at one end of said casing at opposite edges thereof extending longitudinally of the casing in inverted V-shaped position relatively to each other, cutter bars in the shaving heads and means mechanically actuable by said motor for causing simultaneous longitudinal movement in opposite directions of said cutter bars.

10. An electric razor comprising a hollow handle casing, an electric motor in said casing, a pair of substantially fixed elongated slotted shaving heads at one end of said casing at opposite edges thereof extending longitudinally of the casing in inverted V-shaped position relatively to each other, cutter bars in the shaving heads and means mechanically actuable by said motor for causing simultaneous longitudinal movement in opposite directions of said cutter bars said mechanically actuable means including means for causing the slots in the shaving heads to be open during the greater part of the time cycle of said movement.

11. An electric razor comprising a hollow handle casing, a pair of substantially fixed slotted outer elongated shaving heads at one end of said casing at opposite edges thereof extending longitudinally of the casing in inverted V-shaped position relatively to each other, cutter bars movable in said shaving heads, a pivotally mounted lever arm, of substantially Y-shape, adapted to cause reciprocable movements of the cutter bars, an electric motor in said casing, means including a Geneva wheel connecting said motor and said lever arm and a single member extending longitudinally of the casing therein for supporting said lever arm, said Geneva wheel and said motor to hold them in proper operative positions relatively to each other.

BROR G. OLVING.